Figure 1:
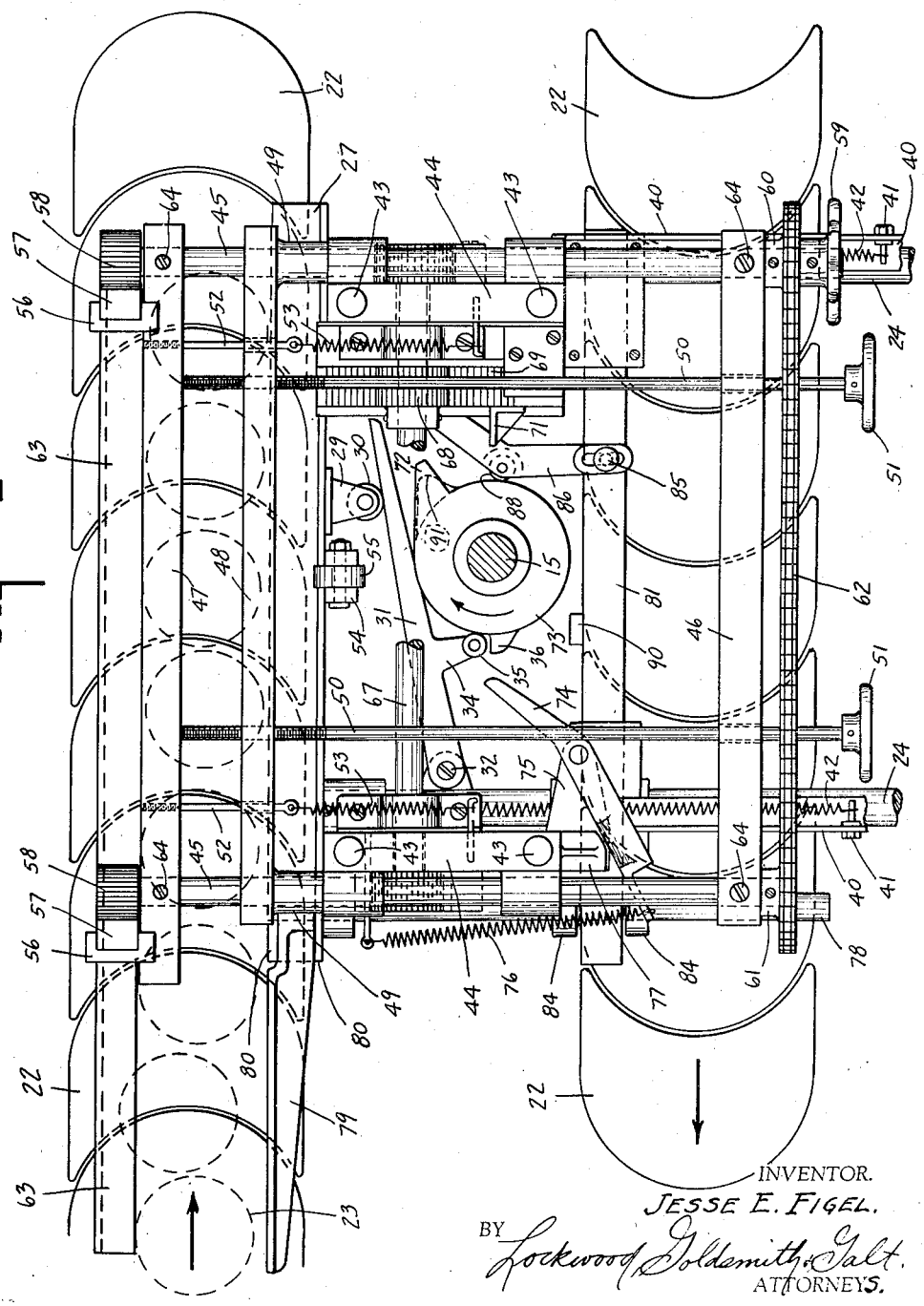

June 4, 1940.  J. E. FIGEL  2,203,385
LEHR FEEDER
Filed Dec. 3, 1938  3 Sheets-Sheet 1

INVENTOR.
JESSE E. FIGEL.
BY Lockwood, Goldsmith & Galt
ATTORNEYS.

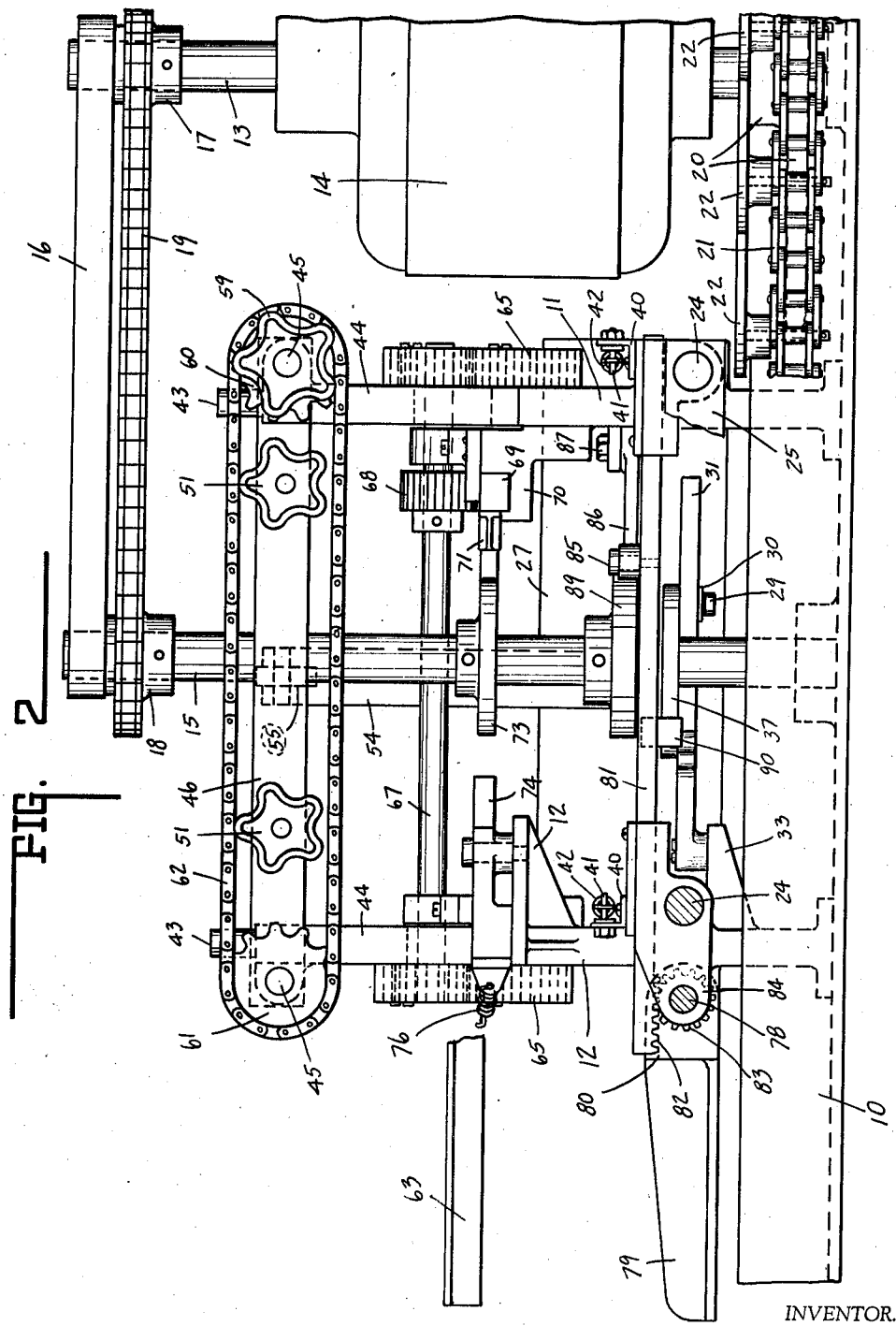

June 4, 1940.    J. E. FIGEL    2,203,385
LEHR FEEDER
Filed Dec. 3, 1938    3 Sheets-Sheet 3
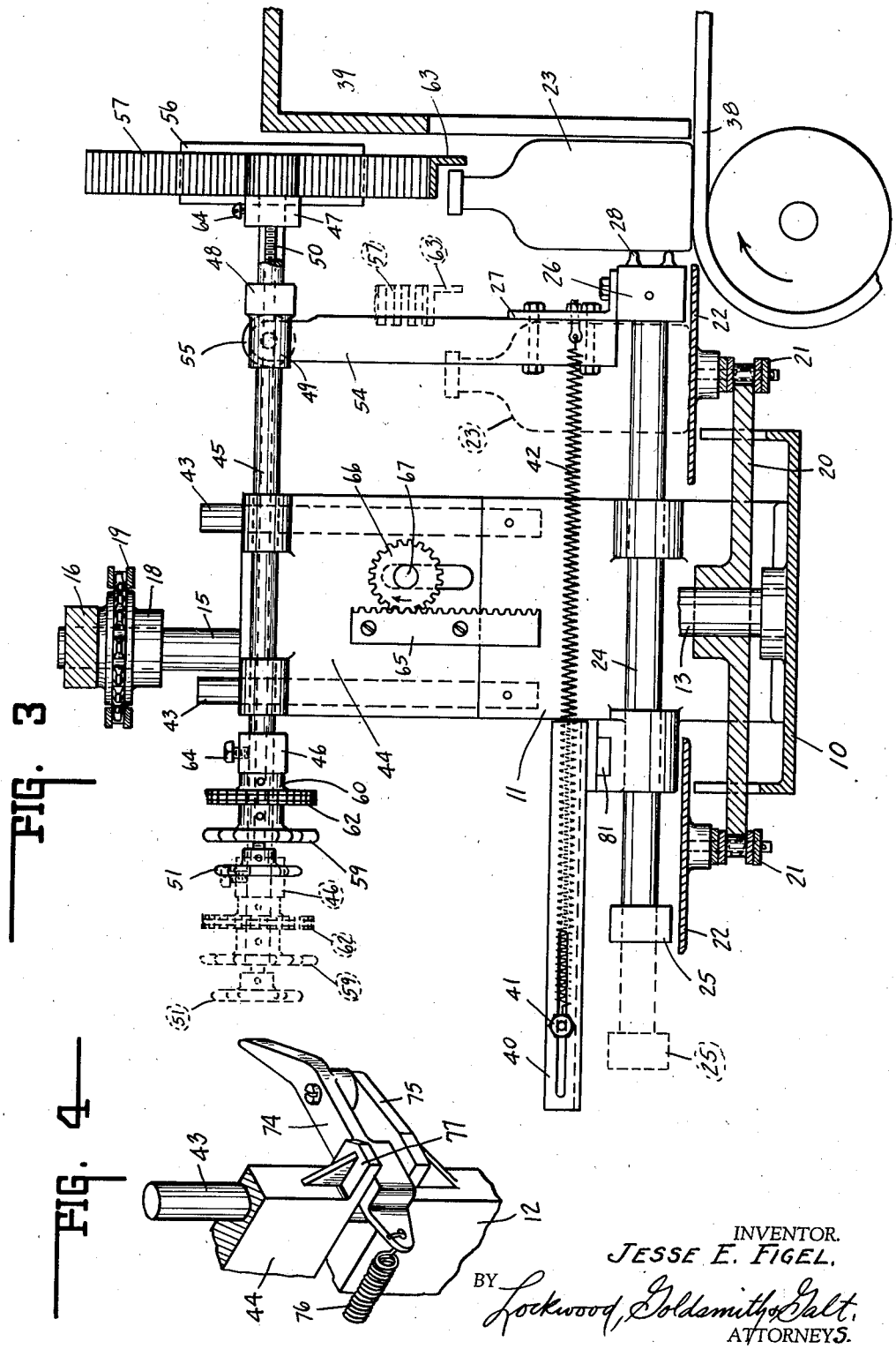
INVENTOR.
JESSE E. FIGEL.
BY Lockwood, Goldsmith & Galt,
ATTORNEYS.

Patented June 4, 1940

2,203,385

UNITED STATES PATENT OFFICE 2,203,385

LEHR FEEDER

Jesse E. Figel, Indianapolis, Ind., assignor to Fairmount Glass Works, Incorporated, Indianapolis, Ind., a corporation Application December 3, 1938, Serial No. 243,708

1 Claim. (Cl. 198—31)

This invention relates to a lehr feeder particularly adapted for receiving a single row of newly formed glass articles from a molding machine and transferring the same in multiple rows to a conveyor which carries the same through an annealing lehr.

One object of the invention is to provide a simple and improved construction for this purpose.

Another object of the invention is to provide a structure which performs this operation with a minimum of damage to the glassware.

Another object of the invention is to provide a structure which is capable of handling a large number of articles in a relatively small time.

These and other objects of the invention are accomplished by the structure disclosed in the following specification and the accompanying drawings:

Fig. 1 is a plan view with parts removed showing a preferred form of the invention. Fig. 2 is a rear elevational view of the same. Fig. 3 is a side elevational view thereof and Fig. 4 is a perspective view of a portion of the operating mechanism.

In the preferred form of the invention shown in the drawings by way of illustration, the stationary framework of the machine includes a channel-shaped foundation member 10 having secured thereto a pair of vertical frame members 11 and 12.

A vertical drive shaft 13 is mounted on a suitable bearing carried by the foundation member 10 and may be rotated from any suitable source of power, such as an electric motor by means of reduction gears carried in a housing 14. A cam shaft 15 is similarly mounted on the foundation member 10. The shafts 13 and 15 each find an upper bearing in a member 16 which maintains the proper spacing between them and which may be suitably supported on the stationary frame structure if desired. The cam shaft 15 is driven by the drive shaft 13 through sprockets 17 and 18 and a chain 19.

The drive shaft 13 carries at its lower end a sprocket 20 about which there is trained a conveyor chain 21. The chain 21 carries a plurality of attachments 22 shaped as best seen in Fig. 1 to present a substantially continuous conveyor surface which is capable of turning about the center of the sprocket 20. The chain 21 and attachments 22 form an endless conveyor which leads from a molding machine or other source of newly formed glassware. Articles 23 may be received on said conveyor as indicated by the broken lines in Figs. 1 and 3.

Slidably mounted on the frame members 11 and 12 there is a pusher structure consisting of a pair of push rods 24 connected together at their rear ends by a cross member 25 and at their forward ends by a cross member 26 having an angle plate 27 secured thereto. The cross member 26 is faced with a plurality of strips 28 of a material suitable for engaging the glassware without damaging the same. The cross member 26 has secured thereto a bracket 29 carrying a roller 30 engaged by a lever 31 pivotally mounted at 32 on a bracket 33 formed on the frame member 12. The lever 31 carries an arm 34 on which there is mounted a roller 35 engageable by a projection 36 on a cam 37 mounted on the cam shaft 15. In the rotation of said cam shaft, the engagement of the projection 36 with the roller 35 presses the lever 31 outwardly and thus moves the pusher structure outwardly to push a plurality of the glass articles 23 from the conveyor 22 to a conveyor 38 which is constantly moved in a direction transverse to the movement of the conveyor 22 and which conducts the articles into and through an annealing lehr 39.

A pair of angle bars 40 are secured to the frame members 11 and 12 and have adjustably secured thereto a pair of bolts 41, each of which has anchored thereto a tension spring 42 anchored at its opposite end to the angle plate 27. As the projection 36 clears the roller 35, the springs 42 return the pusher structure to its original position.

Each of the frame members 11 and 12 has mounted thereon a pair of vertical posts 43 on which there is slidably mounted a pair of vertically movable members 4. Each of said members has slidably and rotatably mounted thereon a horizontally disposed rod 45, said rods being connected together at their rear ends by a cross beam 46 and at their forward ends by a cross beam 47. A cross member 48 is slidably mounted on the rods 45 and is spaced from the members 44 by a pair of collars 49 in the normal position of the apparatus shown in Fig. 1. A pair of adjusting rods 50 threadedly engage suitable holes in the cross member 48 and are journaled in the cross beam 46. The ends of the rods abut against the cross beam 47 and the opposite ends are fitted with hand wheels 51 by means of which said rods may be turned to adjust the spacing between members 47 and 48. A pair of rods 52 are anchored to the cross beam 47 and pass freely through suitable openings in the members 48. Said rods have secured thereto tension springs 53, the opposite ends of which are anchored to the members 44. A vertical bar 54 is secured to the angle bar 27 and carries at its upper end a roller 55 positioned to engage the rear face of the cross member 48.

The cross beam 47 has secured thereto adjacent each end a rack guide 56 with each of which there is slidably engaged a rack 57 engaging a pinion 58, said pinions being secured to the rods 45. The opposite end of one of the rods 45 carries a hand wheel 59 and a sprocket 60. The second of the rods 45 carries a sprocket 61. A chain 62 is trained about said sprockets. An angle bar 63 is secured to the lower ends of the racks 57.

In the normal position of the apparatus as shown in Fig. 1, the springs 53 hold the cross bar 47 against the ends of the adjusting rods 50. Said rods are adjusted so that the angle bar 63 assumes the position shown in broken lines in Fig. 3 in which it is spaced from the upper part of the articles traveling on the conveyor 22 sufficiently to permit said articles to pass without interference. The height of the angle bar 63 is adjusted by first loosening set screws 64 by means of which the rods 45 are secured to the cross members 46 and 47, and then turning the hand wheel 59 to move the angle member 63 upwardly or downwardly to the desired level. The set screws 64 are then tightened to retain the same at the proper level.

In the outward movement of the pusher structure, the roller 55 strikes the cross member 48 just before the article 23 reaches the angle member 63. During the remainder of the movement, said angle member travels to the right in Fig. 3 slightly ahead of the upper part of the article and thus prevents the same from being tipped over in the transfer from the conveyor 22 to the conveyor 38.

Each of the vertically movable members 44 has secured thereto a rack 65 engaging a pinion 66 carried by a shaft 67 journaled in suitable bearings on the frame members 11 and 12 and extending through slotted openings in the members 44. Said shaft also carries a pinion 68 meshing with a horizontally movable rack 69 which is slidably mounted on a bracket 70 carried by the frame member 11. The rack 69 has secured to one side thereof a projection 71 positioned in the path of movement of a projection 72 on a cam 73 mounted on the cam shaft 15. A lever 74 is pivoted on a bracket 75 on the frame member 12 and normally is held by a tension spring 76 against a flange 77 formed on one of the vertically movable members 44.

Just before the roller 35 is released by the cam projection 36 to permit return movement of the pusher structure and the angle bar 63, the projection 72 strikes projection 71 and moves the rack 69 to the rear. The movement of said rack is transmitted by the pinion 68, shaft 67 and the pinions 66 to the racks 65 and the vertically movable members 44. These members are lifted thereby and carry with them the angle bar 63 to a sufficient height to clear the tops of the articles. At the same time, the flange 77 is lifted above the lever 74 so that said lever is free to move beneath said flange. The vertically movable structure is thus supported on the lever 74 through the return movement of the angle bar 63 which thus passes over the articles which have just been placed on the conveyor 38 and such other articles as may be coming in on the conveyor 22. After the return movement is completed, the projection 72 strikes the end of the lever 74 and moves said lever to its original position, permitting the vertically movable structure to descend by gravity to its normal position.

At one side of the frame member 12 there is slidably and rotatably mounted a rod 78. The opposite end has secured thereto an arm 79 which is mounted between flanges 80 formed on the cross member 26 and which thus moves the rod 78 forwardly and backwardly in the movement of the pusher structure. A bar 81 is slidably mounted on the frame members 11 and 12 and carries a plurality of rack teeth 82 engageable with a pinion 83 which is splined to the rod 78 between a pair of bearing brackets 84. The rod 81 carries a pin 85 operating in a slotted opening in the end of a lever 86 which is pivotally mounted on the frame member 12 by means of a pin 87 (Fig. 2). The lever 86 carries a roller 88 engageable with a cam 89 carried by the cam shaft 15. The bar 81 carries a downwardly projecting member 90 engageable by the projection 36 of cam 37.

In the operation of this portion of the apparatus, the arm 79 forms an extension of the pusher member 26 during the outward movement thereof. At the end of said movement and before the roller 35 is released by the cam projection 36, the roller 88 is engaged by a projection 91 on the cam 89 and thus moves the lever 86 and the bar 81 to the right in Fig. 1. This movement of the bar operates through the rack teeth 82 and pinion 83 to rock the rod 78 and lift the arm 79 to a substantially vertical position. This position is maintained through the return movement of the pusher mechanism and until the projection 36 strikes the member 90. The latter event occurs just prior to the engagement of the projection 36 with the roller 35 for the initiation of a new movement of the pusher. The arm 79 is returned thereby to its initial position.

The position of the several projections on the cams are such that the outward movement of the pusher mechanism occupies a small percentage of the total time. The return movement is even more rapid since it is accomplished entirely by spring action. The provision of the arm 79 and the raising of said arm to a vertical position permits the continued delivery of articles on the conveyor 22 during both the outward and return movements of the pusher mechanism as long as the speed of the conveyor is such that it does not move more than the length of the arm 79 during the time that the pusher mechanism is out of its normal position. Since both the conveyor and the pusher mechanisms are driven from the same power source, they may be accurately timed so that no articles will pass the inner end of the arm 79 during the movement of the pusher.

It will be apparent that the invention provides apparatus for feeding a lehr which is simple in construction and certain in its operation. It is readily adjustable for different types of glassware and insures against breakage by the prevention of tipping of the articles during their movement to the lehr. The provision of the movable arm 79 combined with proper timing of the several movements of the parts insures that the receipt of articles on the conveyor 22 need not be interrupted. By this means the machine may easily take care of the capacity of a modern bottle forming machine.

The invention has been defined in one of its preferred forms, the details of which may be varied between wide limits without departing from the scope thereof as defined by the appended claim.

The invention claimed is:

A feeder for a lehr having an endless lehr conveyor passing therethrough including a stationary frame structure, an endless conveyor traveling in a direction transverse to that of said lehr conveyor, a reciprocable pusher carried by said frame structure and adapted when reciprocated to move articles from said second mentioned conveyor to said first mentioned conveyor, said pusher having a pivotally mounted portion adjacent the end from which articles are received on said second endless conveyor, and power means for operating said second mentioned conveyor and said pusher in timed relation and for elevating said pivotally mounted portion during the return movement thereof to clear incoming articles on said conveyor, the movement of said conveyor during the forward and return movement of said pusher being no greater than the length of said pivotally mounted portion of said pusher.

JESSE E. FIGEL.